United States Patent Office 3,473,289
Patented Oct. 21, 1969

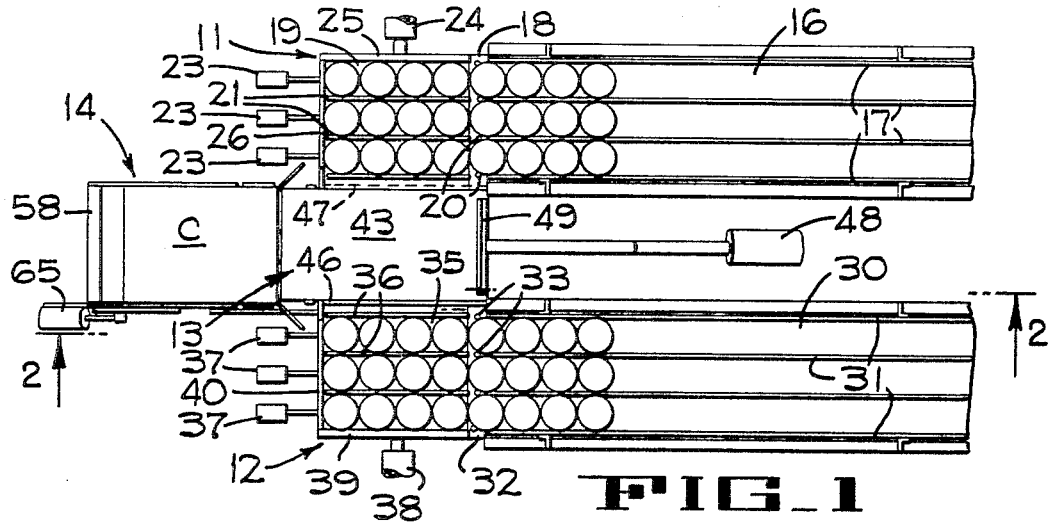
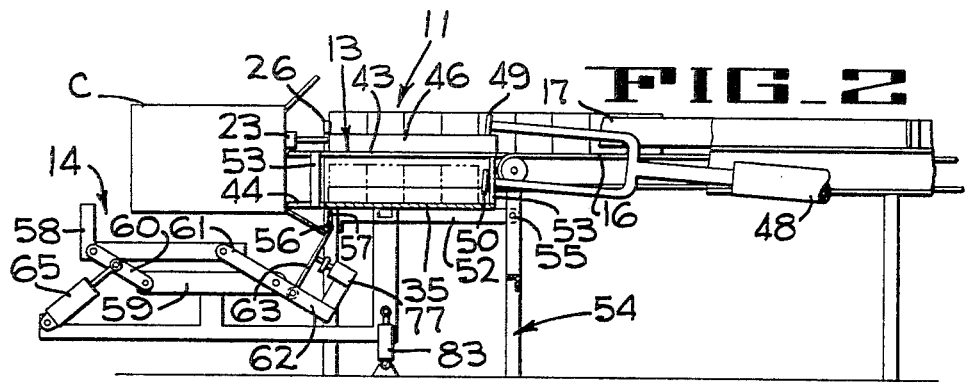
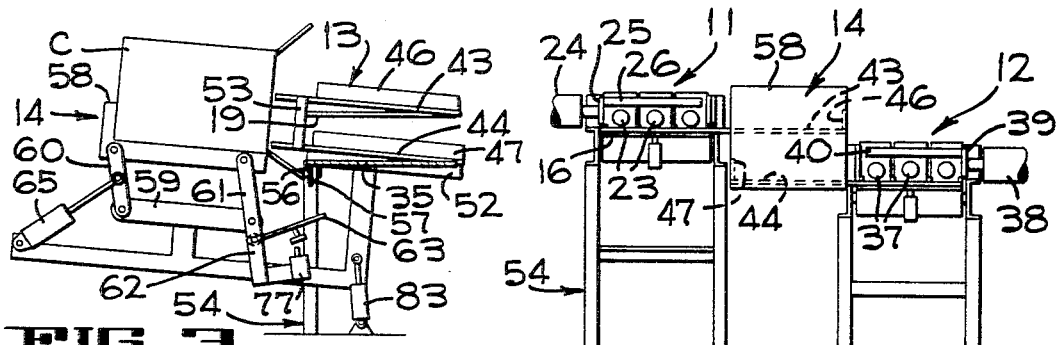
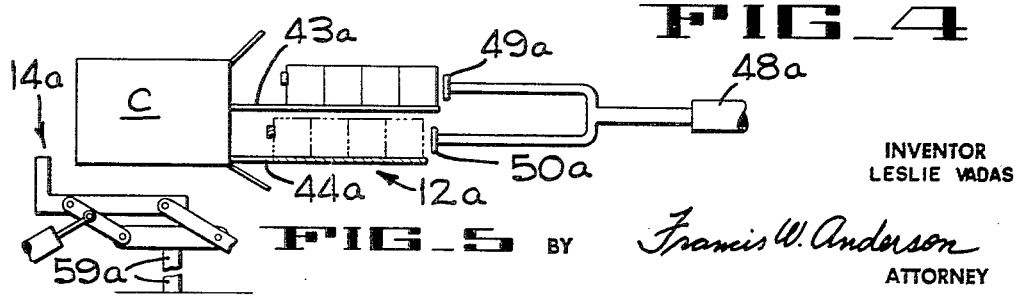

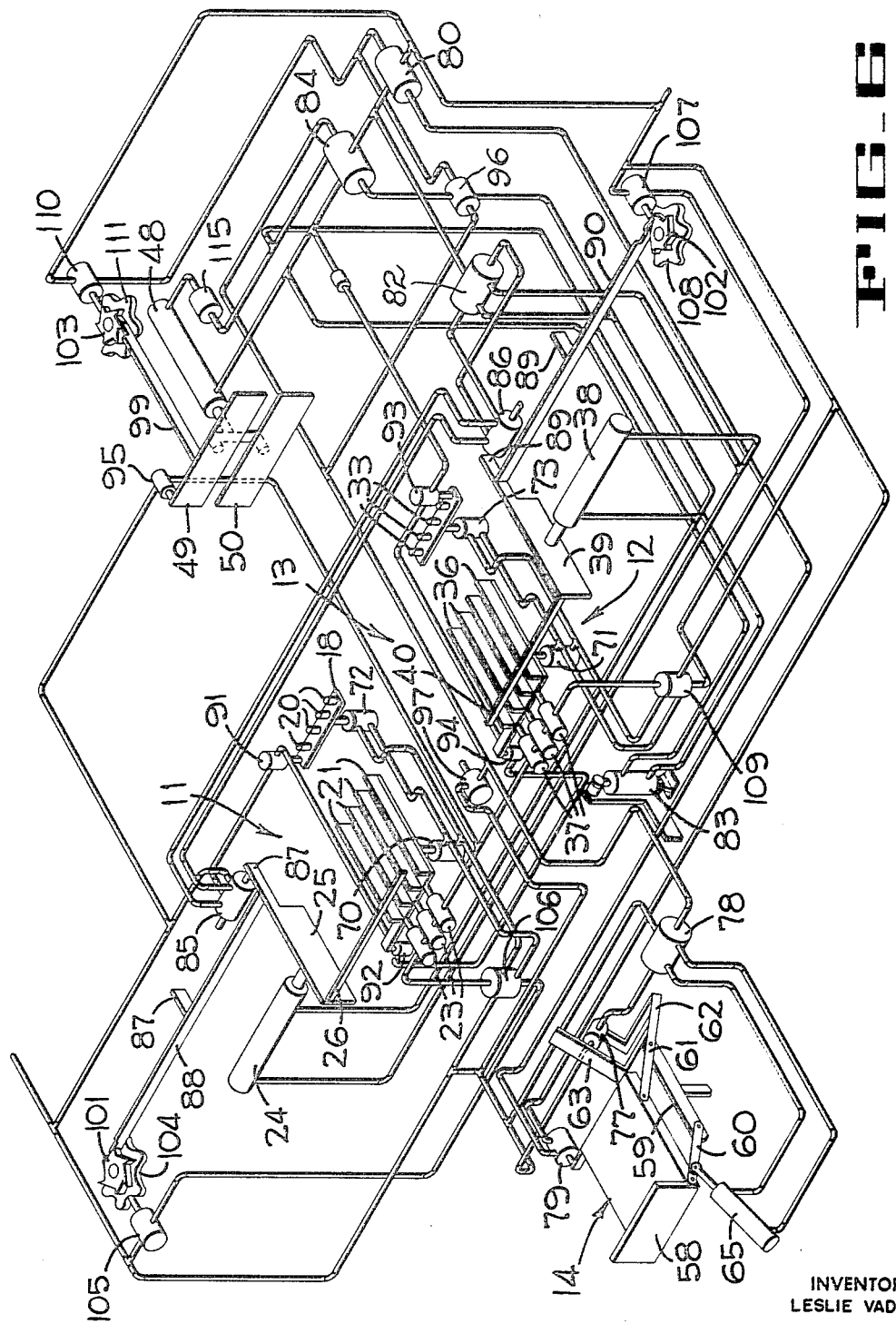

3,473,289
CASE LOADING MACHINE
Leslie Vadas, Los Gatos, Calif., assignor to FMC Corporation, San Jose, Calif., a corporation of Delaware
Filed Jan. 19, 1967, Ser. No. 610,387
Int. Cl. B65b 35/40, 35/54, 57/14
U.S. Cl. 53—61                                  8 Claims

ABSTRACT OF THE DISCLOSURE

A machine for loading two vertical tiers of cylindrical cans into an end-open case. The cans are fed by belt conveyors to upper and lower accumulating platforms and are moved laterally of the belt conveyors to central loading platforms by pneumatically powered pushers. The cans are then moved parallel to the belt conveyors from the loading platforms and into the case by a bifurcated pneumatically powered pusher. A pneumatic control system for carrying out the above operations. A lowerator for supporting and lowering the filled case.

BACKGROUND OF THE INVENTION

Field of the invention

Case loading machines, particularly end-open case loading machines which handle a plurality of vertical tier of articles simultaneously. Pneumatic control systems for case loading machines.

Description of the prior art

Prior art machines for loading cylindrical articles into end-open cases have either loaded only a single tier of articles or have required rotation of the articles about their transverse axes prior to placing them in the case. Other loading machines have been unsuitable for both orienting and loading plural tiers of upright cylindrical articles.

SUMMARY OF THE INVENTION

The invention pertains to a machine for loading cylindrical articles into a case and, more particularly, pertains to orienting at least two groups of upright cylindrical articles into patterns of parallel rows and feeding these articles in two vertical tiers while in such patterns into an end-open case. In addition, the invention pertains to an improved pneumatic control circuit for automatically controlling the operation of the loading machine and to a lowerator for supporting and lowering a filled case.

BRIEF DESCRIPTION OF THE DRAWING

FIGURE 1 is a schematic plan of one embodiment of the case loading machine.

FIGURE 2 is a vertical section taken along the line 2—2 of FIGURE 1.

FIGURE 3 is a schematic, fragmentary vertical section of the machine showing a portion thereof in another operating position.

FIGURE 4 is an end elevation, with parts broken away for clarity, of the machine shown in FIGURE 1.

FIGURE 5 is a schematic, fragmentary section of a modified embodiment of the machine.

FIGURE 6 is a schematic isometric of the control and actuating circuitry for the machine.

DESCRIPTION OF THE PREFERRED EMBODIMENT

In general, the case loading machine comprises a first or upper orienting station 11, a second or lower orienting station 12, a central loading station 13, and a case holding mechanism or lowerator 14. Articles are accumulated and oriented into patterns of aligned rows at the orienting stations, are then moved laterally into two vertical tiers at the loading station and finally are moved into an end-open case placed in the case holding mechanism. In this manner a plurality of randomly positioned articles are gathered into patterns and thence placed into an end-open case all the while maintaining their upright positions.

The upper orienting station 11 is supplied with upright cylindrical articles on a belt input conveyor 16. Mounted above the conveyor are a plurality of fixed guide rails 17 which form the articles into rows. A horizontal plate 18 forms a bridge between the conveyor and an accumulating platform or dead plate 19. The platform forms a part of the orienting station which further comprises retractable stop pins 20, that arrest movement of the articles off the conveyor, and a set of retractable guide rails 21 for aligning the articles on the accumulating platform into one tier. A plurality of sensing devices in the form of pneumatic valves 23 are provided at the end of each row formed by the guide rails. Positioned for movement over the accumulating platform is an upper side pusher 24 provided with a head 25 having an extension rail 26. The extension rail forms a forward barrier to halt the movement of the articles beyond the end of the accumulating platform.

Feeding the lower orienting station 12 is a lower belt input conveyor 30 also provided with fixed guide rails 31 and a bridge forming plate 32. The conveyor feeds upright cylindrical articles to the orienting station which is provided with a set of rectractable pins 33 identical to the pins 20. At the orienting station there is also provided a lower accumulating platform or dead plate 35 for assembling a second tier of articles, a set of retractable guide rails 36 and sensing devices 37. A lower side pusher 38 overlies the accumulating platform and is provided with a head 39 having an extension rail 40 all of which function in identically the same manner as the previously described components at the upper orienting station 11.

The loading station 13 is positioned centrally between the two orienting stations 11 and 12 and comprises an upper loading platform 43 aligned with the upper accumulating platform 19 and a lower loading platform 44 (FIG. 4) aligned with the lower accumulating platform 35. Each of the loading platforms has a side rail, the upper platform having its side rail 46 positioned on the side of the platform adjacent the lower orienting station and the lower loading platform having its side rail 47 (FIG. 4) positioned adjacent the upper orienting station. The side rails provide barriers for engaging the two tiers of articles when moved from the orienting stations onto the loading platforms into superposed relation and further serve as guides when the two tiers forming one case filling charge of articles are moved from the loading platforms into a case on the case holding mechanisms 14. Provided at the upstream end of the loading platforms, to the right as viewed in FIGURE 1, is a main pusher 48 having an upper and a lower head 49 and 50, respectively, which simultaneously eject both tiers into the case.

In the preferred embodiment, shown in FIGURE 2, the main pusher and heads are slightly inclined. The loading platforms are mounted on a pivotal frame 52 by a plurality of struts 53. The pivotal frame is fastened to a main support frame 54 by a pivot bolt 55 at its upstream end and guidebolts 56 at its downstream end. The guidebolts rest in slots 57 formed in the main support frame. When the pivotal frame is raised the loading platforms are also simultaneously raised through an angle which approximately is equal to the inclination of the main pusher 48. This inclination has been found successful in reducing the tendency of the forward articles on the top tier from falling forward as the articles are moved by the main pusher off the loading platforms.

The case holding mechanism 14 is positioned at the downstream end of the loading station 13 and comprises a case rest 58 which is oscillatably mounted on a movable frame member 59 by pairs of downstream and upstream links 60 and 61, respectively. The movable frame member is also fixed to the pivotal frame 52. Raising the movable frame tilts the case holding mechanism and the pivotal frame. The upstream link 61 on the right, as viewed in FIGURE 2, is provided with an extension 62 (FIGS. 2 and 6) that mounts a valve actuating arm 63 for a purpose to be later described. A pneumatic actuator 65 is fastened to the righthand downstream link and, upon energization, raises the case rest into the position shown in FIGURE 3. To load a case on the case rest, an operator holds a case C approximately horizontal with its lower flap against the valve actuating arm 63. When the case rest moves upward it engages and supports the case.

A modified form of the invention is shown in FIGURE 5 wherein the main pusher is identified by the numeral 48a and comprises upper and lower heads 49a and 50a, respectively. The lower head is spaced downstream from the upper head a distance approximately equal to one-quarter of the diameter of the cylindrical articles being loaded. Likewise, a lower orienting station 12a is located downstream a distance approximately equal to one-quarter of an article diameter such that the articles when loaded onto the loading platforms 43a and 44a are not in vertical alignment with one another. In other words, the upper rows of articles overlap the lower rows so that when they are moved off the loading platforms into the case C the upper articles will rest on two lower articles and maintain stability while being moved. As the articles maintain their stability without the necessity for inclining the case and loading platforms, a frame member, like movable frame member 59 of the preferred embodiment is not used. Instead, the case rest 14a is rigidly supported on a frame member 59a. The remaining details of this modification are identical to the preferred embodiment. As may be readily seen, the modified embodiment provides an alternative means to reduce the tendency of having the upper articles tip off the lower articles while being moved into the case.

An additional problem in mechanized case loading is the difficulty in providing accurate and safe timing of the various operations. It is also the purpose of this invention to provide a pneumatic control circuit for operating the machine. This control circuit and the various actuating components are best shown in FIGURE 6 and comprise the side pushers 24 and 38 and the main pusher 48 all of which are operated by conventional pneumatic actuators or cylinders. The upper retractable guide rails 21 are raised and lowered by a pneumatic actuator 70 while the lower retractable rails 36 are raised and lowered by a pneumatic actuator 71. Actuators 72 and 73 pneumatically operate the upper pins 20 and the lower pins 33, respectively.

The operation will be best understood taken in conjunction with the description of the remainder of the pneumatic control circuit. The conveyors 16 and 30 are continuously driven such that a supply of upright articles are available at the accumulating platforms 19 and 35. When the air supply is turned on and a case C is held by an operator in a horizontal position with its lower flap depressing the valve actuating arm 63, the valve actuating arm depresses a valve stem of a valve 77 to open the valve to air pressure. In this description all the valves are conventional air valves, several well known designs being suitable, thus, no details of their construction will be given. Pilot air (air to position another valve) passes through the valve 77 to a valve 78. The pilot air pressure moves the valve 78 to open it allowing air to pass into the pneumatic actuator 65 while simultaneously venting the opposite end of the actuator. The actuator then raises the case rest 58 into the position shown in FIGURE 3; however, the case rest is not tilted until later.

When the case rest is raised it engages the case C and, as it approaches its raised position, it depresses a valve stem of a valve 79 to open the valve to the air pressure. Pilot air then passes through the valve 79 and into the end port of a control valve 80. Control valve 80, when moved into its opened position by the pilot air pressure from the valve 79, is opened and allows air to pass to two valves 82 and 84.

The upstream link 61, as it pivots clockwise, lowers the valve actuating arm 63 out of engagement with the flap of the case, releasing the valve stem of the valve 77. The valve 77 then returns to its original position venting the pilot air from the left side of the valve 78. The flap of the case will not again depress the valve actuating arm during this loading cycle.

The valve 82 controls the pneumatic actuators for the side pushers 24 and 38, whereas the valve 84 controls the main pusher 48. The position of the valve 82 is controlled by two valves 85 and 86 located at the upper and lower orienting stations 11 and 12, respectively. Valve 85 has two valve stems which are arranged to be contacted by extension members 87 fixed to a ratchet arm 88. The ratchet arm is fixed to the head 25 of the upper side pusher 24. In like manner, the stems of the valve 86 are also arranged to be contacted by extension members 89 fixed to a ratchet arm 90 which is mounted on the head 39 of the lower side pusher 38. When the respective heads of the side pushers are retracted as shown in FIGURE 6, the valve stems on the valves 85 and 86 are contacted by the extension members closest to the loading station 13 so that the valve ports farthest from the loading station are opened. When this occurs pilot air will pass from a valve 91, to be later described, through the valves 85 and 86 to move the valve 82 into a position in which one end of each actuator of the side pushers is vented while the other is energized so that the heads 25 and 39 are extended to transfer the articles onto the loading platforms. A built-in interlock feature, however, prevents air from passing through the valve 91 and thus through the valves 85 and 86 until the accumulating platforms at both orienting stations are filled with articles, the retractable guide rails 21 and 36 are lowered, and the stop pins 20 and 33 are raised.

For accomplishing this interlock a set of four valves 91–94 are provided. Valve 91 is opened when the stop pins 20 are raised at the upper orienting station 11. Valve 92 is opened when the guide rails 21 at the upper orienting station 11 are lowered. Valve 93 is opened when the stop pins 33 at the lower orienting station 12 are raised. Finally, valve 94 is opened when the guide rails 36 at the lower orienting station are lowered. The stop pins 20 and 33 are raised and the guide rails 21 and 36 are lowered only after all of the rows of articles are filled and the main pusher 48 is retracted. A valve 95 is opened when its valve stem is contacted by the retracted upper main pusher head 49. Pilot air passes through the valve 95 and, if all of the sensing devices or valves 23 and 37 are opened, the pilot air enters the upper end, as viewed in FIGURE 6, of two valves 106 and 109 (to be later described) opening these valves to permit air to enter the lower ends of the actuators 72 and 73 and the upper ends of the actuators 70 and 71 while simultaneously venting their opposite ends. This raises the stop pins and lowers the guide rails thus causing the valves 91–94 to be opened.

Pilot air entering through valve 80 and then through valve 84 passes through a check valve 96 and if all of the valves 91–94 are opened the pilot air passes through each of these series-connected valves thence through series-connected valves 85 and 86 and into the left end, as viewed in FIGURE 6, of the valve 82. As aforementioned, the valve 82 is then opened to allow air to extend the side pusher heads 25 and 39. It should be noted that valve 84 at this time also admits air to the forward end of the cylinder of the main pusher 48, to maintain the heads 49 and 50 retracted, as well as to the check valve 96. The valve 84 was placed in this position near the end of the previous operating cycle as will be explained later.

When the side pusher heads 25 and 39 have discharged the articles onto the respective loading platforms the stems of the valves 85 and 86 are engaged by the extension members 87 and 89 to open the ports of these valves closest to the loading station 13. Pilot air then passes through the valves 85 and 86 from the main air line and enters the end of the valve 82 remote from the loading station. This opens the ports in this valve so that air entering the valve 82 from the valve 80 passes into the innermost ends of the actuators of the side pushers 24 and 38 while simultaneously venting the opposite ends to retract the heads 25 and 39. The air not only passes through valve 82 at this time to retract the side pusher heads but also acts as pilot air and enters (through a valve 98) one end of the valve 84, the left end as viewed in FIGURE 6, to open the ports in that valve to admit air through valve 80 into the upstream end of the cylinder of the main pusher 48, while venting the opposite end, and into the lower end of a pneumatic actuator 83, while venting its opposite end, to raise the movable frame member 59. The heads 49 and 50 are then extended, moving the two-tier charge of articles into the case C on the now tilted, case rest 58. A suitable flow control valve 115, which restricts flow into the upstream end of the actuator 48 but does not restrict flow out of the actuator, is used in the line entering the cylinder of the main pusher so that the extension rails 26 and 40 are completely retracted prior to moving the articles off the loading platforms.

When the main pusher heads 49 and 50 are completely extended, the pusher head 50 engages the stem of a valve 97 to admit pilot air from the main air line into the opposite or right end, as viewed in FIGURE 6, of the valve 84 while simultaneously admitting pilot air to one end of a valve 98. The latter valve is moved to a position wherein the pilot air acting on the lefthand side of the valve 84 is vented and the pilot air passing through the valve 82 to the valve 84 is blocked. Thus, the valve 84 is reversed allowing air to again retract the pusher heads 49 and 50 and enter the top of the actuator 83 to lower the movable frame member 59. Air passing through the valve 97 also acts as pilot air and enters the righthand end, as viewed in FIGURE 6, of the valve 78 to move the valve and allow air to enter the forward end of the actuator 65 while venting the opposite end, to lower the case rest 58. As the case rest is lowered the valve 79 is released, venting the pilot air acting on the left hand end, as viewed in FIGURE 6, of the valve 80.

As was previously mentioned, each of the side pushers 24 and 38 are provided with ratchet arms 88 and 90, respectively. Likewise, the main pusher 48 also has a ratchet arm 99 fixed to the head 49. These ratchet arms set-up the circuit for the next loading operation and prevent premature re-cycling. The ratchet arms are positioned to engage ratchets 101–103, respectively, each of which is integrally connected to a cam 104, 108 and 111. Ratchet 101 is positioned to be engaged by the ratchet arm 88 at the upper orienting station 11 and is moved counterclockwise, as viewed in FIGURE 6, upon each retraction of the side pusher 25. A cam follower is connected to the valve stem of a valve 105 and is moved by a lobe on the cam 104 after each loading cycle to open the valve 105. Pilot air then passes through the valve 105 and enters the underside of the valve 106 to position that valve so that air pressure enters the top of the pneumatic actuator 72 to lower the stop pins 20 and enters the bottom of the pneumatic actuator 70 to raise the retractable guides 21. At the lower orienting station a similar valve 107 is provided with a cam follower. When the cam follower moves over a lobe of the cam 108 the valve 107 is opened to permit pilot air to enter the underside of the valve 109. This opens ports in the valve 109 to admit air to the top of the pneumatic actuator 73 to lower the stop pins 33 and to admit air to the bottom of the pneumatic actuator 71 to raise the retractable rails 36. Both of the valves 105 and 107 are opened prior to the pusher heads returning to their fully retracted positions. Thus, when the extension members depress the stems of the valves 85 and 86, upon complete retraction of the side pushers, there is no pilot air available to move the valve 82. This, of course, prevents premature cycling of the side pushers.

A valve 110 is provided with a cam follower which is moved by the lobes of the cam 111 connected to the ratchet 103 at the main pusher. When the ratchet 103 after each cycle is rotated counterclockwise, as viewed in FIGURE 6, the cam follower moves over a lobe on the cam and opens valve 110 to admit pilot air to the righthand end of the valve 80. This vents the valve 80 and cuts off air to the entire system. The valve 80 is not reopened until an empty case is placed in engagement with the valve actuating arm 63 and the valve 77 is reopened. Pilot air also passes through the valve 110 to the opposite end of the valve 98 to return that valve to its open position.

Summarizing the operation it can be seen that a case C must be placed with its flap depressing the valve actuating arm 63 in order to begin cycling the machine. When a case is in place the case rest 58 is raised, the guide rails 21 and 33 are lifted, and the stop pins 20 and 33 are retracted. Articles are fed onto the accumulating platforms 19 and 35 until such time as complete patterns or rows are formed. The pins are then raised stopping further movement of the articles onto the platforms and the retractable guide rails are lowered. Following this operation the side pushers 24 and 38 are energized to move the articles onto the loading platforms 43 and 44. The side pushers are then retracted and the main pusher 48 is energized to push the articles into the end-open case and the actuator 83 is energized to raise the movable frame member 59. When the case is filled the main pusher is retracted, the case rest is returned to its lowered position, the movable frame is again lowered, and the components are all recycled to begin a new operation.

The pneumatic circuit and operation of the modification shown in FIGURE 5 is substantially the same as that of the preferred embodiment. However, rather than tilt the case, loading platforms, etc., the case is filled while in a horizontal position.

As is readily apparent, the case loading machine of the present invention is simple in design and in operation and effectively orients into patterns and loads a plurality of upright cylindrical articles. The machine includes an improved control system to effectively carry out the loading operation while maintaining built in interlocks to prevent errors in loading. In addition, the case holding mechanism or lowerator is of a simple, efficient construction and provided rapid movement between a raised and a lower horizontal position.

While the preferred embodiment and one modification have been shown and described, it will be understood that various further changes and modifications may be made without departing from the spirit of the invention or the scope of the appended claims.

Having thus described the present invention and the manner in which the same is to be used, what is claimed as new and desired to be protected by Letters Patent is:

1. A case loading machine comprising a first accumulating platform, a second accumulating platform spaced laterally of and below said first platform, at least two vertically spaced central loading platforms between said accumulating platforms, said accumulating platforms each having a plurality of retractable guides adapted to define rows of articles to be loaded, side pushers aligned respectively with said accumulating platforms for moving the articles off said accumulating platforms and onto said loading platforms, a case holder, a center pusher aligned with said loading platforms and said case holder for moving the articles off said loading platforms into a case on said case holder, and a control circuit for energizing said pushers at predetermined intervals whereby articles are loaded automatically.

2. The machine defined by claim 1 wherein said case holder is mounted for movement into an inclined case loading position.

3. The machine defined by claim 1 including first article sensing devices located at the end of each row of articles on each accumulating platform for determined when all rows are filled with articles.

4. The machine defined by claim 3 further including actuator sensing devices arranged to be engaged by said side and center pushers for determining the positions of said pushers, said sensing devices and said pushers being interconnected through said control circuit.

5. Apparatus for loading containers into an end open case comprising a first input conveyor for assembling a first tier of containers at an orienting station on an upper level, a second input conveyor in spaced parallel relation to said first input conveyor for assembling a second tier of containers at an orienting station on a lower level, a loading station intermediate said orienting stations, power means for simultaneously moving the tiers of containers from said orienting stations to said loading station to combine the tiers into two superposed tiers forming one case filling charge of containers, a main pusher movable across said loading station along a path parallel to said input conveyors to eject both tiers of containers, and case holding means for supporting an empty end open case in position to receive the ejected charge of containers.

6. Apparatus according to claim 5 wherein one of said orienting stations is horizontally offset from the other orienting station along the driection of said path so that the leading containers of the upper tier trail the leading containers of the lower tier to stagger the tiers in the direction of ejecting movement by said main pusher, said main pusher including horizontally offset upper and lower pusher heads simultaneously engaging the staggered trailing containers.

7. Apparatus for loading tiers of upright cylindrical articles into a case comprising first means for orienting the articles in a pattern at an orienting station on an upper level, a second means for orienting the articles in a pattern at an orienting station on a lower level, a loading station, means for transferring the articles from said orienting stations to said loading station, said transfer means including first and second side pusher means respectively associated with said first and second orienting means, case holding means, main pusher means at said loading station aligned with said case holding means for moving the articles along a path from said loading station onto said case holding means, a pneumatic actuator for each of said main and side pusher means, means for sensing the position of said actuators, and a pneumatic circuit for controlling said actuators in response to energization of said actuator sensing means.

8. Case loading apparatus comprising a pair of interspaced parallel input conveyors terminating at a common plane transverse to their common direction of conveying movement, a dead plate adjacent the discharge end of each conveyor for collecting groups of upright containers delivered by the conveyors, said dead plates lying in individual horizontal planes vertically separated a distance greater than the height of a container, a powered pusher plate movable over each dead plate, said pusher plates being movable in vertically separated paths toward each other along a common vertical plane normal to the conveying paths of said input conveyors, a loading platform intermediate said dead plates in horizontal alignment with each of said dead plates and in vertical alignment with each other, a main pusher having upper and lower heads movable longitudinally across both loading platforms in a path parallel to and intermediate said conveying paths, a case rest for supporting the open end of a case facing said main pusher from the other side of said loading platforms, and control means for sequentially advancing said pusher plates to transfer a charge of articles delivered by said conveyors to said dead plates onto said loading platforms, retracting said pusher plates, and advancing said main pusher to transfer articles from both loading platforms into the case.

References Cited

UNITED STATES PATENTS

| | | | |
|---|---|---|---|
| 1,496,714 | 6/1924 | Kyler | 53—152 |
| 2,993,316 | 7/1961 | Kerr | 53—164 X |
| 3,039,248 | 6/1962 | Jones | 53—61 X |
| 3,340,672 | 9/1967 | Kayser | 53—153 |
| 3,388,527 | 6/1968 | Vadas | 53—247 |

TRAVIS S. McGEHEE, Primary Examiner

U.S. Cl. X.R.
53—154, 164